United States Patent [19]

Shimoda

[11] Patent Number: 5,754,553
[45] Date of Patent: *May 19, 1998

[54] PACKET CONVERSION APPARATUS AND SYSTEM

[75] Inventor: Kenji Shimoda, Kanagawa-ken, Japan

[73] Assignee: Kabushiki Kaisha Toshiba, Kawasaki, Japan

[*] Notice: The term of this patent shall not extend beyond the expiration date of Pat. No. 5,346,399.

[21] Appl. No.: 695,624

[22] Filed: Aug. 12, 1996

Related U.S. Application Data

[63] Continuation of Ser. No. 314,642, Sep. 29, 1994, Pat. No. 5,546,399.

[30] Foreign Application Priority Data

Sep. 30, 1993 [JP] Japan .................................. 5-245430

[51] Int. Cl.$^6$ .......................................... H04J 3/26
[52] U.S. Cl. ...................... 370/471; 370/473; 370/474; 348/384
[58] Field of Search .................. 370/465, 470, 370/471, 473, 474, 476; 348/384, 426, 441

[56] References Cited

U.S. PATENT DOCUMENTS

| | | |
|---|---|---|
| 4,907,101 | 3/1990 | Kessen et al. . |
| 5,365,272 | 11/1994 | Siracusa ................. 348/384 X |
| 5,376,969 | 12/1994 | Zdepski ................. 348/384 X |
| 5,497,404 | 3/1996 | Grover et al. ............. 370/471 |

FOREIGN PATENT DOCUMENTS

| | | |
|---|---|---|
| 0 579 075 A3 | 1/1994 | European Pat. Off. . |
| 0 637 174 A2 | 2/1995 | European Pat. Off. . |
| 486181 | 7/1990 | Japan . |
| 5344162 | 6/1992 | Japan . |

OTHER PUBLICATIONS

Abstract of JP-A-63 029377; Feb. 1988.
Abstract of JP-A-05 344162; Dec. 1993.
Abstract of JP-A-04 086181; Mar. 1992.

*Primary Examiner*—Melvin Marcelo
*Attorney, Agent, or Firm*—Cushman Darby & Cushman IP Group of Pillsbury Madison & Sutro LLP

[57] ABSTRACT

A packet conversion apparatus includes a detector for detecting heads of transmission packet signals, a packetizer responsive to the detecting means for packetizing the transmission packet signals by sequentially arranging them into one or more recording packets to specify positions of the prescribed number of transmission packets for one or more recording packets, a source for supplying reserved data, and a combiner for inserting the reserved data into a space of the recording packets where no transmission packet signals are present.

10 Claims, 21 Drawing Sheets

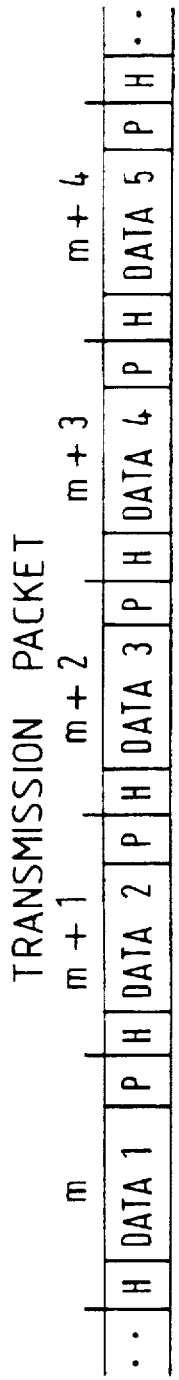

RECORD TRACK

| M = 1 | SYNC | ID | DATA | P |

FIG. 5(a). (PRIOR ART)

RECORD TRACK

| M = 2 | SYNC | ID | DATA | DATA | DATA | P |
| M = 3 | SYNC | ID | DATA | DATA | DATA | P |

FIG. 5(b). (PRIOR ART)

RECORD TRACK

| M = 4 | SYNC | ID | MBA | MBP | DATA | P |
| M = 5 | SYNC | ID | MBA | MBP | DATA | P |
| M = 6 | SYNC | ID | MBA | MBP | DATA | P |
| M = 7 | SYNC | ID | MBA | MBP | DATA | P |

FIG. 5(c). (PRIOR ART)

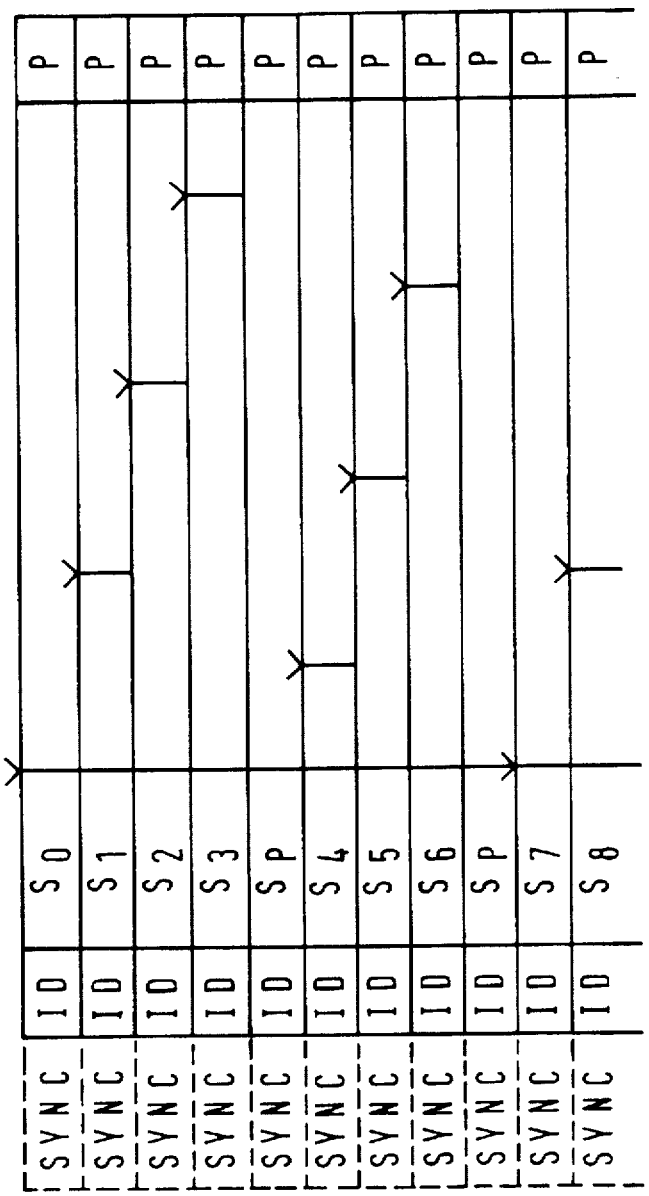
FIG. 13. RECORDING PACKET

PACKET CONVERSION APPARATUS AND SYSTEM

This is a continuation of 08/314,642 filed Sep. 29, 1994 now U.S. Pat. No. 5,546,399.

1. Field of the Invention

The present invention relates to a packet conversion apparatus and a packet conversion system, and more particularly to a packet conversion apparatus and a system suited for use in a recording reproducing apparatus for recording transmission packet signals by converting the transmission packet format into a prescribed recording packet format.

2. Background of the Invention

In a data communication field, a packet communication system which transmits information by breaking the information into blocks and adding additional information for identifying the data has been so far adopted. For digital visual imaging communication, it is also attempted to transmit compressed image data by packetizing.

FIGS. 1 and 2 are diagrams showing exemplified formats of transmission packets.

FIG. 1 shows an example of the transmission packet for use in transmission of data packets m, m+1, m+2, ... by sequentially arranging them, but without synchronizing them with a prescribed sync signal. Each packet comprises a header(H) for use in identifying data in the packet, transmission data and an error correction parity (P) for use in correcting errors in the packet.

On the other hand, FIG. 2 shows an example of a transmission packet for use in the transmission of M packets synchronous with, for instance, a reference cycle of the frames, etc. of video signals. In FIG. 2, one frame is comprised of k packets of data corresponding to respective columns, and each datum of the k packets is comprised of a header H, transmission data, and an error correction parity P. Further, the header H1 of the first packet (M=1) also serves as the header for use in identifying an entire data of the k packets in the n-th frame. Further, the size of the header may vary according to its column position M.

By the way, the size of these packets and the recording unit of a recording apparatus may differ from each other. In this case, packet data are recorded by converting them into a recording format. For instance, the Japanese Patent Application Tokkai-Hei 4-86181 titled as Recording Reproducing Apparatus discloses that transmitted packets are converted into recording packets with a recording format for VTRs. The recording packet disclosed in the Application Tokkai-Hei 4-86181 is comprised of screen positional information MBA (Macro Block Address) and a sync block record start positional information MBP (Macro Block Pointer), both added into the transmission data in the unit of a sync block.

FIGS. 3 and 4 are block diagrams showing the construction of the Japanese Patent Application titled as the Recording Reproducing Apparatus, while FIGS. 5(a), 5(b) and 5(c) are diagrams for explaining the recording packet of the present invention.

FIG. 3 is a block diagram showing another conventional packet conversion apparatus associated with other conventional recording packets, as shown in FIGS. 5(a) and 5(b)

Transmission packet signals are supplied to a receiving circuit 1, and then are transferred to a packetizer 3 via a buffer 2. The buffer 2 is used for adjusting the timings of data processed in later stages. The packetizer 3 converts the transmission packet signal into another packet format signal suited for a recording system, e.g., VTRs.

The recording format of a VTR is basically configured by unit of recording tracks. FIGS. 5(a), 5(b) and 5(c) show three types of recording formats each configured for one record track, wherein one track is comprised of M' packets. Each packet constitutes a sync block (sync unit).

FIG. 5(a) shows an example of the recording track wherein transmission packet signals are sequentially arranged in the transmission order by the packetizer 3. That is, in this case, header and transmission data contained in the transmission packets are arranged in the recording packet in their original order. The recording packets configured in the packetizer 3 are applied to an error correction encoder 4. The error correction encoder 4 adds an error correction parity P into each of the recording packets and provides the resulted recording packets to a combiner 5. Further, an ID generator 6 generates ID data including track number ID data, sync number ID data and other important ID data, and supplies the ID data to the combiner 5. The combiner 5 combines a sync signal SYNC at the head of each recording packet, and then arranges the ID data, information data and the error correction parity P in the recording packet at a prescribed order.

Further, the recording packet shown in FIG. 5(b) represents that the headers and the information data in the transmission packets are each divided into pieces in the recording packets, respectively. In this case, the information data contained in transmission packets are provides from the buffer 2 to the packetizer 3, while headers are provided from the buffer 2 to a header packetizer 8. The header packetizer 8 packetizes the headers and provided the resulted packets to another combiner 7. In this case, the headers are not yet contained in the output of the combiner 5. The combiner 7 arranges the information data and the headers individually and then provides the resulted recording packets.

In the recording packet, as shown in FIG. 5 (a), wherein the transmission packet data are sequentially allocated, that is, all the data containing headers and parities of the transmission packets are continuously allocated, it is not possible to suppress the propagation of errors. For instance, if any error had occurred in the data within the packet, the error position will be found by an error flag. However, unless the sync signal for the transmission packet can be surely detected, it is not possible to restore the original format of the transmission packets during it decoding operation. That is, the sync block in which an error had occurred falls in same state as the packet that lacks some data. Further, it becomes impossible to carry out a correction or an interpolation, etc. on the sync block. However when the detection of the sync signal is secured, it is possible to detect the heads of the packet from data in which no errors occur.

Further, when data and a header are each divided into pieces, as shown in FIG. 5(b), the boundaries of the data will become indefinite. Then, in the case where variable-length codes, etc. are adopted, the header position of a data portion having no errors cannot be detected and a propagation of errors becomes large as in the case shown in FIG. 5(a)

So, in the conventional packet conversion apparatus as disclosed in the above-mentioned Japanese Application with the title of Recording Reproducing Apparatus, a method has been also disclosed for suppressing the propagation of errors even when variable length coded data are input as transmission data. Further, in the present invention picture data are divided into luminance blocks and color difference blocks each having a prescribed volume, respectively. Additionally, a macro block is constructed using a plurality of sub-blocks for use as a unit of predictive coding.

In FIG. 4, Transmission packet signals supplied to the receiving circuit 1 are then transferred to an MB (Macro Block) head detector 11 and a header packetizer 12 via the buffer 2. The MB head detector 11 transfers the transmission data to a data packetizer 13. The MB head detector 11 also detects the head of a macro block from the transmission data and then provides the macro block information to an MBA (Macro Block Address) generator 14. The data packetizer 13 packetizes information data and then provides the packetized data to an MBP (Macro Block Pointer) generator 15 and a combiner 16.

The MBA generator 14 generates an MBA (Macro Block Address) showing an address on the screen to which the macro block corresponds and then provides it to the combiner 16. Further, the MBP generator 15 generates an MBP (Macro Block Pointer) which is the head positional information in a sync block of the macro block and then provides it to the combiner 16. The combiner 16 combines encoded data corresponding to respective screen areas following the macro block address and the macro block pointer and then provides it to the error correction encoder 4. The error correction parity P from the error correction encoder 4 and ID data from the ID generator 6 are arranged in another combiner 17. Thus, as shown in FIG. 5(c), encoded data corresponding to respective screen areas are added with an error correction parity and arranged after the sync signal (SYNC), the ID data, the MBA (Macro Block Address) and the MBP (Macro Block Pointer) in units of one sync block. Further, the header packetizer 12 packetizes headers and sends it to still another combiner 18 for multiplexing with the output of the combiner 17. Recording track data are thus formed.

As described above, in this case, the propagation of errors is suppressed by extracting the screen positional information contained in transmission packets and recording two kinds of information, i.e., the screen positional information MBA indicating the correspondence between the data and the screen, and the positional information MBP showing data positions in recording packets.

However, the apparatus shown in FIG. 4 generates the MBA and the MBP by extracting additional information contained in transmission packets where there was such a problem that the circuit scale increases greatly.

As described above, in a conventional packet conversion apparatus, in order to suppress the propagation of errors, the positional information MBP, and the screen positional information MBA are generated by extracting additional information contained in the transmission packets when converting transmission packets into recording packets and there is such a in problem that the circuit scale increases greatly.

SUMMARY OF THE INVENTION

It is, therefore, an object of the present invention to provide a packet conversion apparatus which is capable of suppressing the propagation of errors and reducing the circuit scale.

In order to achieve the above object, a packet conversion apparatus according to one aspect of the present invention includes a detector for detecting the headers of transmission packet signals, a packetizer responsive to the detecting means for packetizing the transmission packet signals by sequentially arranging them into one or more recording packets to specify positions of the prescribed number of transmission packets for one or more recording packets, a source for supplying reserved data, and a combiner for inserting the reserved data into a space of the recording packets where no transmission packet signals are present.

In the present invention, the head detection means detects the head of transmission packets. The packetizing means packetizes the prescribed number of transmission packets by sequentially arranging them over one or more recording packets based on the detection result. As a result, the head of the prescribed number of transmission packets appears at, for instance, the head of one or more recording packets. The reserved data source supplies the reserved data or the dummy data into a portion of the recording packets, where no transmission packet has been arranged, and outputs the recording packets. Further, when arranging transmission packets continuously in recording packets in a prescribed length, the head position of transmission packets on the recording packets is detected and the positional information indicating the head of the transmission packet signal on the recording packet is generated by the position detecting means. By inserting the positional information into a prescribed position on the recording packets by the inserting means, it becomes possible to find the correspondence between recording packets and transmission packets.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is a diagram for explaining one example of transmission packets:

FIG. 2 is a diagram for explaining another example of transmission packets;

FIGS. 5(a), 5(b) and 5(c) are diagrams for explaining recording packets achieved by the conventional packet conversion apparatuses;

FIG. 13 is a diagram for explaining an example of recording packets achieved by the embodiment of FIG. 12.

DESCRIPTION OF THE PREFERRED EMBODIMENTS

The present invention will be described in detail with reference to the FIGS. 6 through 24.

Figure 3:
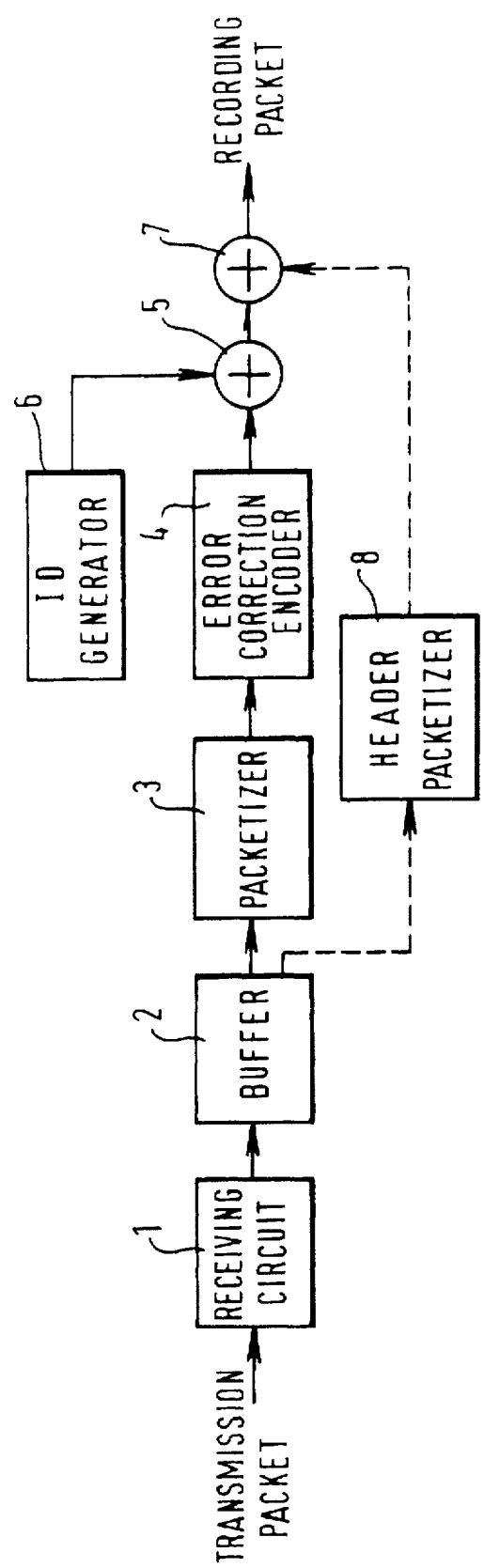
FIG. 3 is a block diagram showing a conventional packet conversion apparatus.
Figure 4:
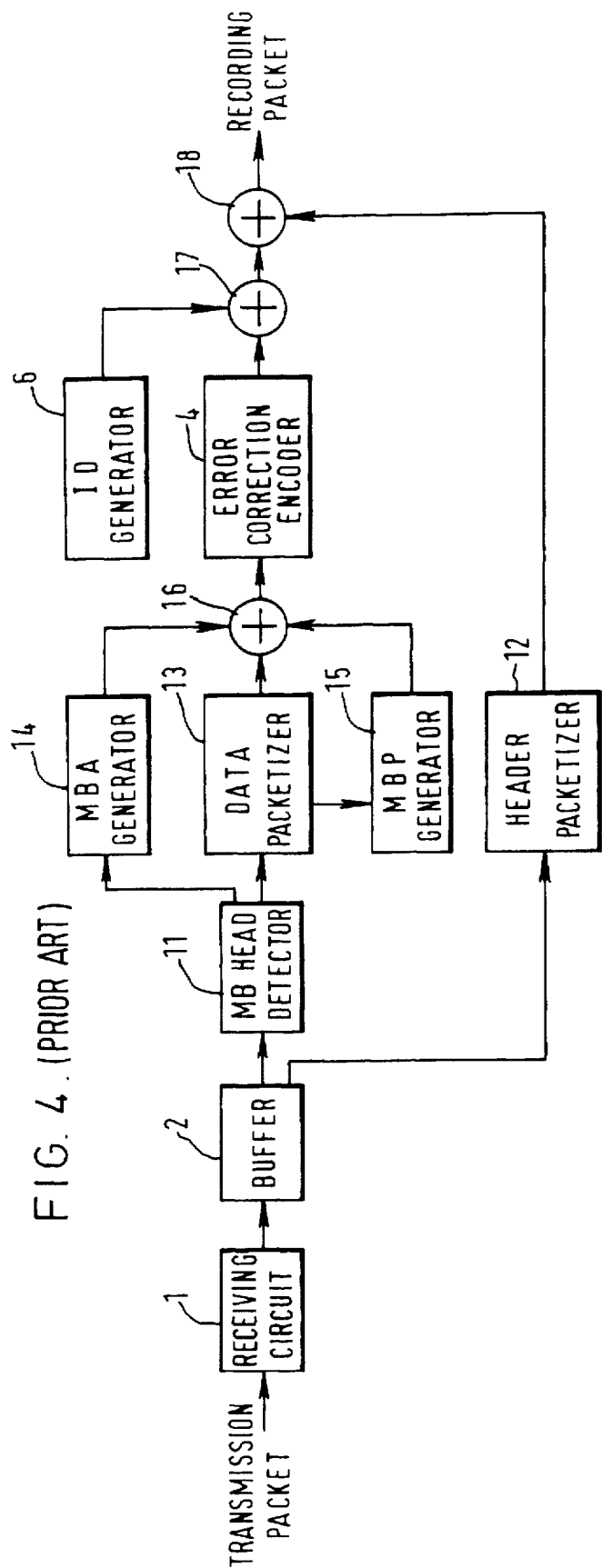
FIG. 4 is a block diagram showing another conventional packet conversion apparatus.
Figure 6:
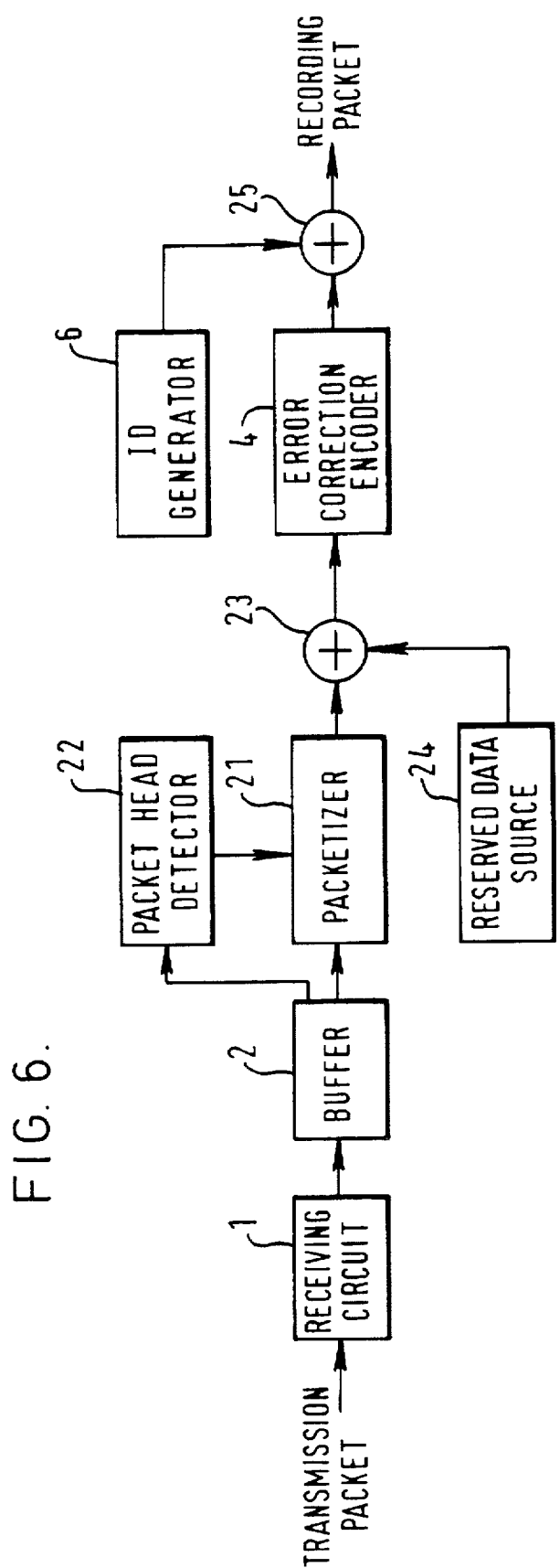
FIG. 6 is a block diagram showing a first embodiment of a packet conversion apparatus according to the present invention.

FIG. 6 is a block diagram showing a first embodiment of the packet conversion apparatus according to the present invention.

Transmission packet signals are input to a receiving circuit 1. The receiving circuit 1 demodulates the transmission packet signals and transfers them to a buffer 2. The buffer 2 temporarily holds the demodulated transmission packet signals, and then provides them to a packetizer 21 and a packet head detector 22. The packet head detector 22 detects the head of the transmission packet signals in search of headers of the transmission packets and then provides the resulted detection signal to the packetizer 21.

In this embodiment, the packetizer 21 packetizes n' pieces of transmission packet signals into N' (N'+n') pieces of recording packets, based on the detection signal directing the head of transmission packets. For instance, if the length of transmission packets and the length of recording packets are such that [the length of recording packets ×2]>[the length of transmission packets]>[the length of recording packets], the packetizer 21 packetizes the transmission packet signals assuming that, for instance, N'=2 and n'=1. The packetizer 21 arranges transmission packet signals in series starting from its head. Accordingly, under the conditions, the transmission packet signals are arranged for the whole of the first recording packet and only the head of the second effective recording field of two recording packets and a portion with no transmission packets arranged will be produced in the trailing end of the second effective recording field.

The packetized recording format signals output from the packetizer 21 is applied to a combiner 23. An output of a reserved data source 24 is also applied to the combiner 23. The reserved data source 24 supplies reserved data or dummy data of, for instance, continued "1", etc. The combiner 23 selects the outputs of the packetizer 21 and the output of the reserved data source 24 by switching them at prescribed regular intervals and inserting the reserved data or the dummy data into a portion with no transmission packet arranged in the trailing end of the second recording packet, outputs the recording packet to the error correction encoder 4.

The error correction encoder 4 outputs each recording packet data by adding the error correction parity to another combiner 25. The ID generator 6 generates the sync signal (SYNC) and ID data of each recording packet and applies them to the combiner 25. The combiner 25 add the sync signal (SYNC) and ID data to the head of each recording packet and outputs as a recording packet.

Next, the operation of the embodiment in the construction as described above will be explained with reference to the explanatory diagram shown in FIG. 7.

The receiving circuit 1 demodulates the transmission packet signals and transfers them to the packetizer 21 and the packet head detector 22 via the buffer 2. The header of the transmission packet contains the head position data. Further, the header may contain the information on screen position of data, etc. Therefore, if in this case the transmission packet signals have been continuously reproduced, it is possible to detect positions on the screen and also positions in the transmission packets by extracting the headers of the transmission packets. However, as the heads of the transmission packets are unknown, if an error is generated as described above, it is not necessarily possible to use transmission packets in demodulation even when the lengths of transmission packets are constant.

On the contrary, in this embodiment it is made possible to identify the transmission packet signals by identifying recording packets through the fixture of the correspondence of transmission packets to recording packets. That is, the packet head detector 22 detects the head of the transmission packet signal in search of the header contained in the transmission packet signal read from the buffer 2 and applies the detection signal to the packetizer 21. If [recording packet length ×2]>[transmission packet length]>[recording packet length], the packetizer 21 packetizes one transmission packet for two recording packets as shown in FIG. 7. That is, the front parts of the transmission packets PT1, PT2, . . . . are sequentially arranged to the first recording packets PR11, PR21, . . . starting from the head, and the remaining parts of the transmission packets PT1, PT2, . . . are sequentially arranged to the recording packets PR12, PR22, . . . . Since [recording packet length ×2]>[transmission packet length]>[recording packet length], in the trailing ends (shown in the shaded regions) of the second recording packets PR12, PR22, . . . . , portions with no transmission packets arranged will be produced. As a result of this packetizing, the n' pieces of the transmission packets are always arranged at prescribed positions of the N' pieces of the recording packets and the correspondence between the recording packets and the transmission packets will become clear.

Figure 7:
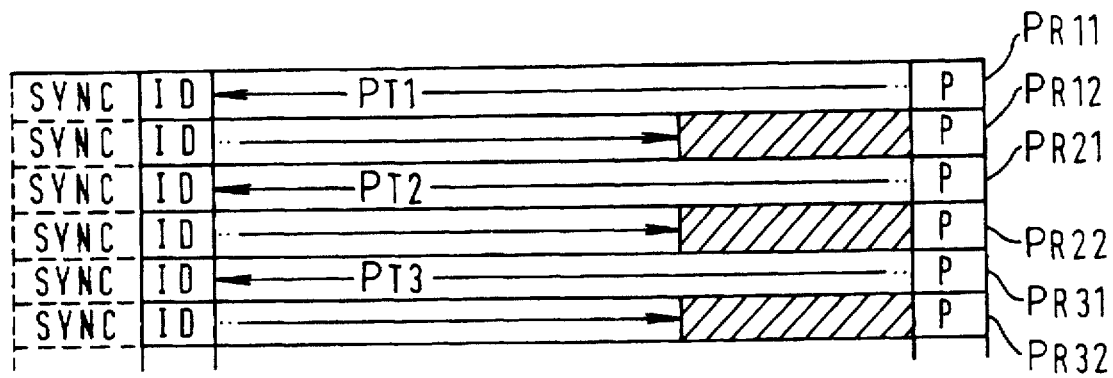
FIG. 7 is a diagram for explaining an example of recording packets achieved by the embodiment of FIG. 6.
Figure 8:
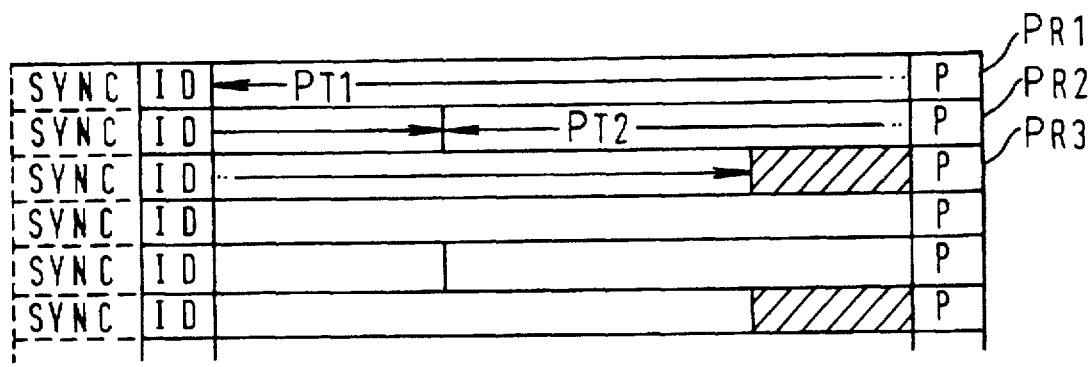
FIG. 8 is a diagram for explaining another example of recording packets achieved by the embodiment of FIG. 6.

The output of the packetizer 21 is applied to the combiner 23 and thus the reserved data or the dummy data from the reserved data source 24 are inserted in the recording packets at the timing of the shaded regions, as shown in FIG. 7. The error correction encoder 4 applies the output of the combiner 23 with the error correction parity P added to the combiner 25. The output of the ID generator 6 is also applied to the combiner 25. The combiner 25 arranges the sync signal (SYNC) and ID data from the ID generator 6 at the head of the recording packets as shown in FIG. 7 and outputs the recording packets.

As described above, the packetizer 21 packetizes one transmission packet signal over two recording packets in this embodiment. Accordingly, the head of a transmission packet signal will be arranged to every other recording packet in this case. Therefore, even if an error is generated, it is possible to identify transmission packet signals after restored from the error from ID of recording packets and thus, a propagation of errors can be suppressed.

Further, in the above embodiment, values of N' and n' may be determined according to the relationship between the transmission packet length and the recording packet length. For instance, if the unused portions as shown in the shaded regions increase when it is set as shown in the example in FIG. 7, two transmission packets PT1 and APT2 may be packetized over three recording packets PR1, PR2 and PR3.

Figure 9:
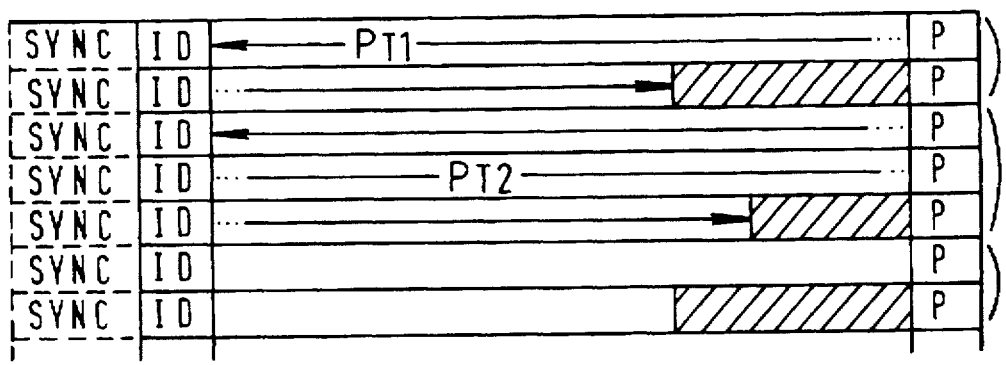
FIG. 9 is a diagram for explaining still another example of recording packets achieved by the embodiment shown in FIG. 6.

Further, the embodiment described above is also applicable to cope with when a transmission packet length varies. FIG. 9 shows examples of transmission packets transmitted in two different lengths. In the examples shown in FIG. 9, the packetizer 21 executes a mode for packetizing one transmission packet signal for two recording packets and a mode for packetizing one transmission packet signal for three recording packets by switching them.

Figure 10:
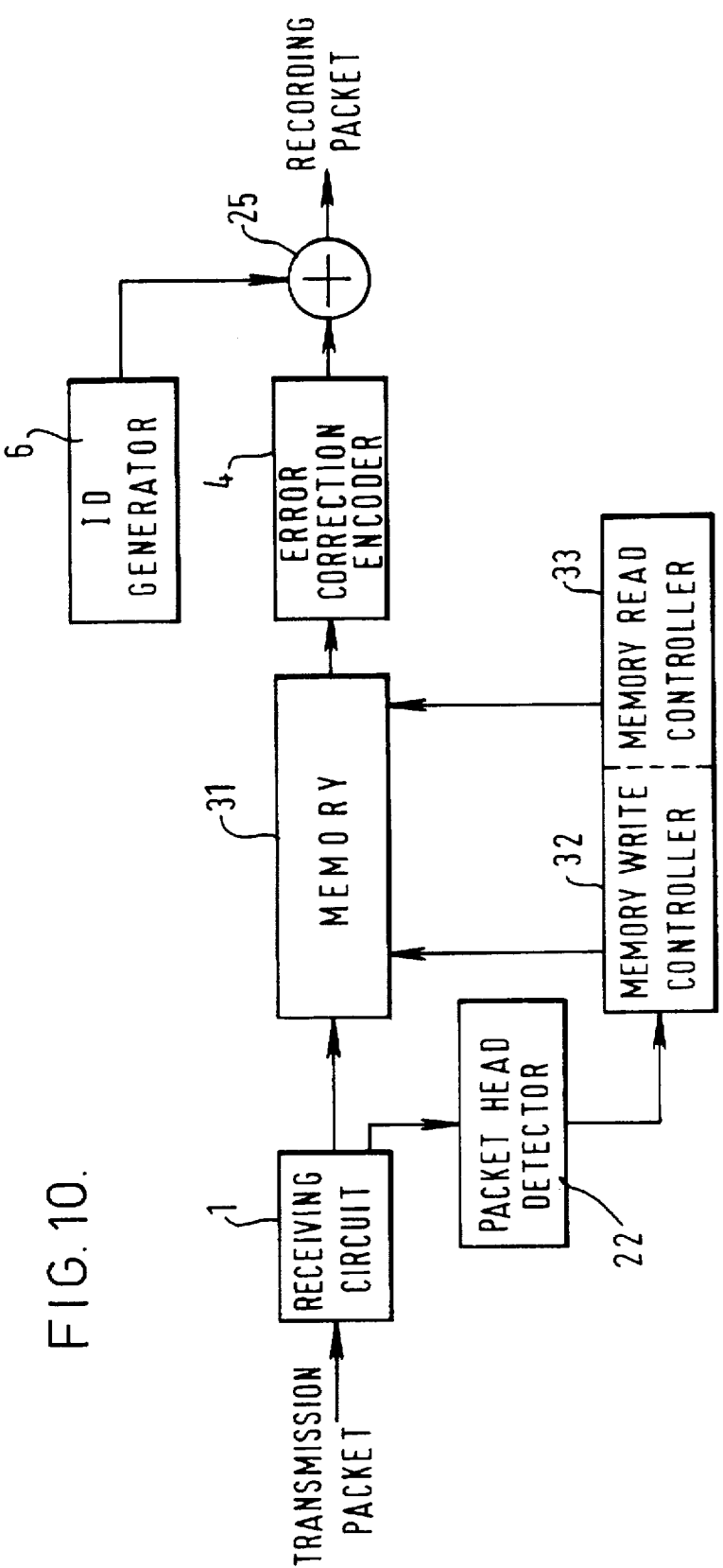
FIG. 10 is a block diagram showing a second embodiment of a packet conversion apparatus according to the present invention.

FIG. 10 is a block diagram showing a second embodiment of the present invention. In FIG. 10, the same reference numerals used in FIG. 6 will be used to designate like or equivalent elements and the explanation will be omitted.

In this embodiment, a memory is used for arranging transmission packet signals. That is, transmission packet signals from the receiving circuit 1 are applied to the packet head detector 22, and also to a memory 31. The memory 31 has a capacity for storing N' pieces of recording packets and holds the reserved data or the dummy data before transmission packets are input. A memory read controller 33 reads the n' pieces of the transmission packets stored in the memory 31, based on a detection signal from the packet head detector 22. The memory read controller 33 first reads the n' pieces of the transmission packets stored in the memory 31, and then reads the reserved data or the dummy data and provides them to the error correction encoder 4.

Figure 11:
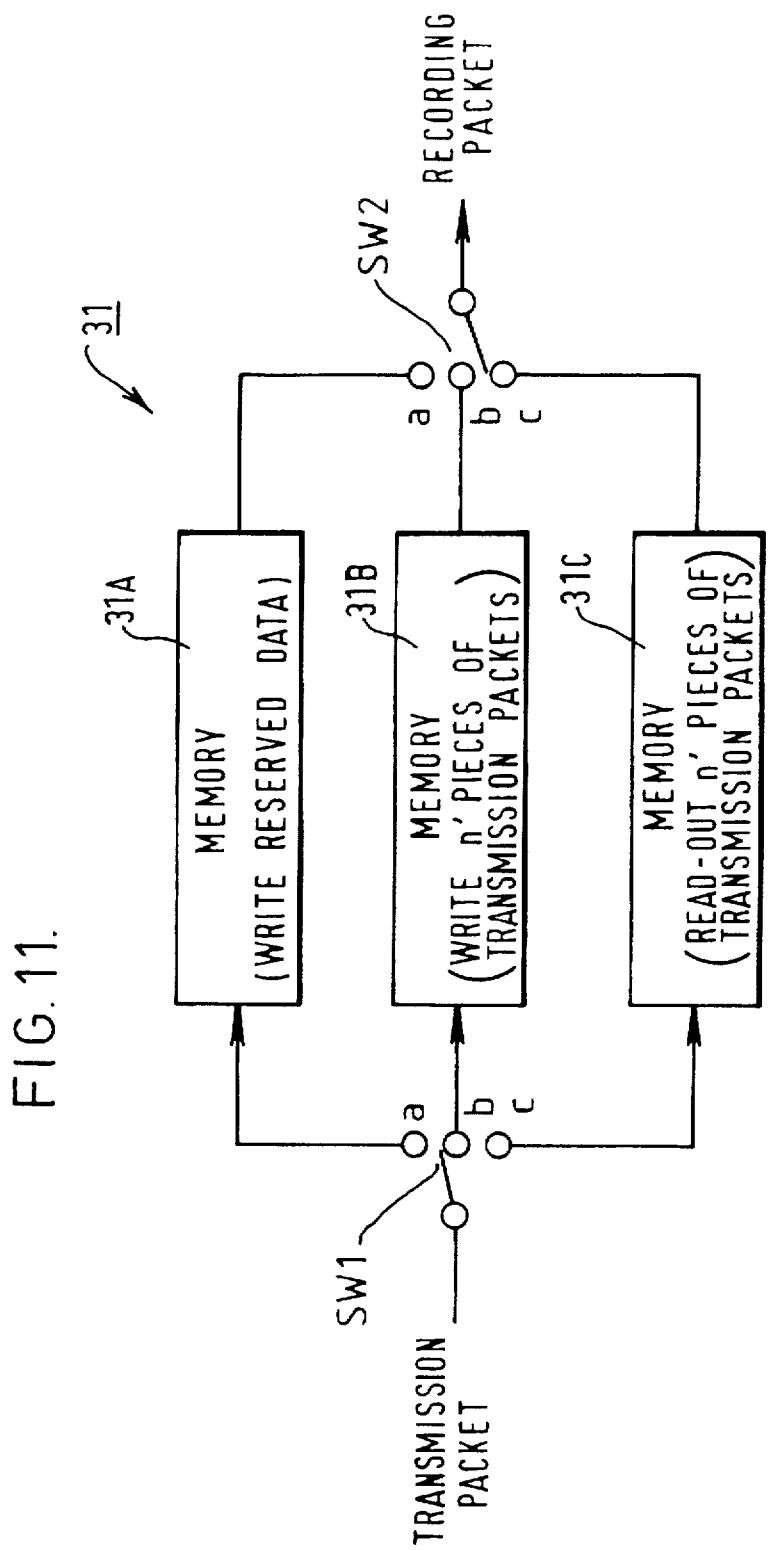
FIG. 11 is a block diagram showing an exemplified construction of the memory of FIG. 10.

FIG. 11 is a block diagram showing a definite construction of the memory 31 in FIG. 10.

The memory 31 comprises three memories 31A, 31B and 31C which are recordable the N' pieces of the recording packets.

The transmission packets are selectively provided from the receiving circuit 1 to the three memories 31A, 31B and 31C via a switch SW1. Further, the outputs of the memories 31A, 31B and 31C are output via a switch SW2. The switches SW1 and SW2 are controlled by the memory write controller 32 and the memory read controller 33, respectively.

Next, the operation of the embodiment in the construction as described above will be explained with reference to FIG. 11.

Transmission packet signals are supplied to the receiving circuit 1 and then are transferred to the packet head detector 22 and the memory 31. Before writing the transmission packets into the memory 31, the reserved data or the dummy data are written into the memory 31A. When a detection signal indicating the head of transmission packet is provided from the packet head detector 22, the memory write controller 32 makes the switch SW1 select terminal b and thus the n' pieces of the transmission packets are sequentially stored in the memory 31B. In this case, the memory read controller 33 causes the switch SW2 to select terminal c and thus the data is stored into the memory 31C. As described later, the n' pieces of the transmission packets are already stored in the memory 31C.

When the n' pieces of transmission packet have been read from the memory 31C, the memory read controller 33 causes the switch SW2 to select a terminal a so as to read out the reserved data or the dummy data stored in the memory 31A. Thus, the same recording packets as the output of the combiner 23 shown in FIG. 6 are obtained.

At the next timing, before writing the transmission packet signals into the memory 31, the reserved data or the dummy data are written into the memory 31C. Then, the memory write controller 32 cause the switch SW1 to select the terminal a to start the writing of the n' pieces of the transmission packets into the memory 31A, based on the detection signal from the packet head detector 22. On the other hand, the memory read controller 33 makes the switch SW2 to select the terminal b so as to read out the n' pieces of the transmission packets previously stored in the memory 31B. When completing the readout operation, the memory read controller 33 makes the switch SW2 to select the terminal c so as to read out the reserved data or the dummy data stored in the memory 31C.

Thereafter, repeating the same operation and shifting the writing operation and the reading operation of the transmission packets among the memories 31A, 31B and 31C, a plurality of recording packets with the same format, as shown in FIG. 6, are obtained.

Figure 12:
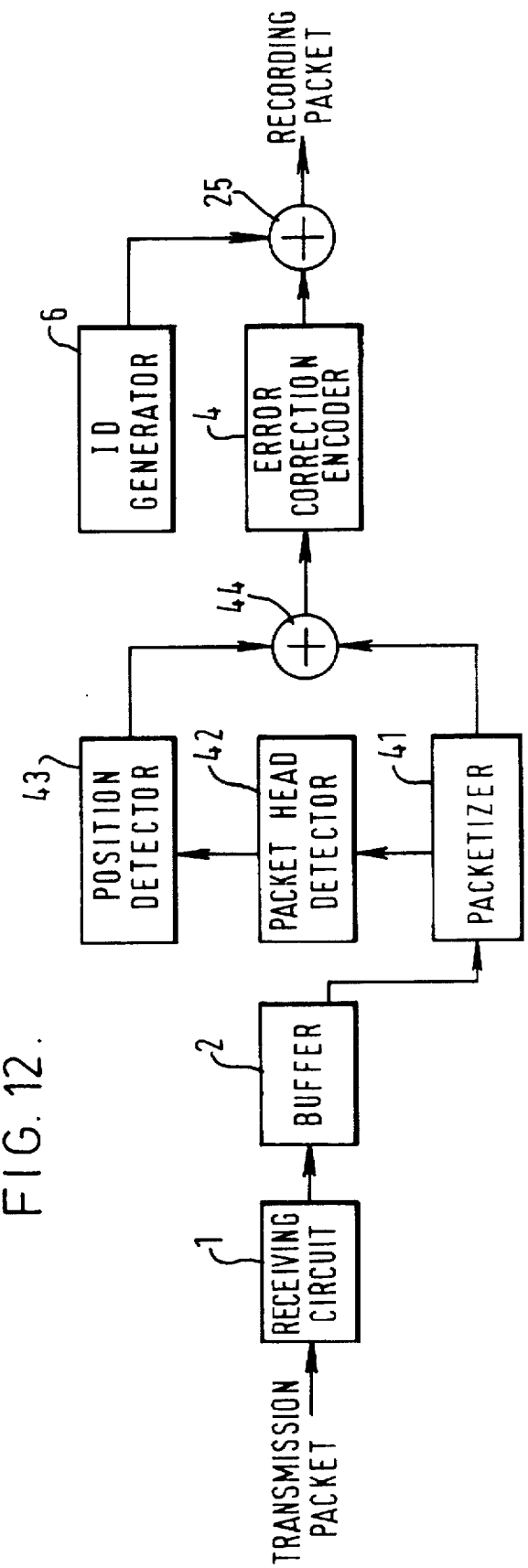
FIG. 12 is a block diagram showing a third embodiment of a packet conversion apparatus according to the present invention.

FIG. 12 is a block diagram showing a third embodiment of the present invention. In FIG. 12, the reference numerals used in FIG. 6 will be used to designate like or equivalent elements and the explanation will be omitted.

In this embodiment, the positional information showing the head of a transmission packet signal is recorded in respective recording packets for making it possible to suppress a propagation of errors even when the transmission packet signals are arranged in series.

Transmission packet signals read from the buffer 2 are applied to a packetizer 41. The packetizer 41 packetizes the transmission packet signals by continuously arranging them in their transmission order and then provides the resulted packets to a combiner 44 and a packet head detector 42. The packet head detector 42 detects positional information in recording packets, which indicates where the head of transmission packet signal is positioned and then provides the detected information to a position detector 43. The position detector 43 generates a positional information indicating the head position of the transmission packet signals in search of a distance from the head of the recording packet according to the detection information and then provides the detected positional information to another combiner 44. The combiner 44 locates the positional information from the position detector 43 on the head of the recording packet achieved by the packetizer 41 and then provides the resulted recording packets to the error correction encoder 4.

Next, the operation of the above embodiment as constructed as shown in FIG. 12 will be explained with reference to FIG. 13. FIG. 13 is an explanatory diagram for explaining the recording packets achieved in this embodiment.

The transmission packet signals read from the buffer 2 are sequentially arranged by the packetizer 41, starting from the head of the recording packet. If the length of the transmission packet is longer than the length of the recording packet but shorter than the length of two recording packets, the transmission packet signal is arranged over two recording packets up to the middle of the second recording packet, as shown in FIG. 13. The packet head detector 42 detects the heads of the transmission packet signals in the recording packets as marked by symbols (v) in FIG. 13. Then the resulted detection information is applied to the position detector 43. The position detector 43 generates positional data S0, S1, S2, S3, SP, S4, . . . indicating the heads of the transmission packet signals by the respective distances from the head of the recording packet. As shown in FIG. 13, the combiner 44 adds the positional data on fronts of the recording tracks achieved by the packetizer 41. All other operations are the same as the above-mentioned embodiment of FIG. 6.

The positional information S0 and S7 added to the fronts of the first and tenth recording packets, as shown in FIG. 13, indicate that the heads of the corresponding transmission packet signals also define the heads of the recording packets. Further, the positional information Sp indicates that its associated recording packet signal does not include any head of the transmission packet signal.

As described above, in this embodiment, as the positional information of the head of the transmission packet signal is added to every recording packet, it is easy to find the correspondence between recording packets and transmission packets. Therefore, for instance, even when a recording packet drops out due to errors. it becomes easy to identify transmission packet signals and also to troubleshoot the VTR.

The present invention is not limited to the embodiments as described above, but a variety of modifications will be devised. Here, some of the modifications will be described in reference to the drawings FIGS. 14 through 24.

Figure 14A:
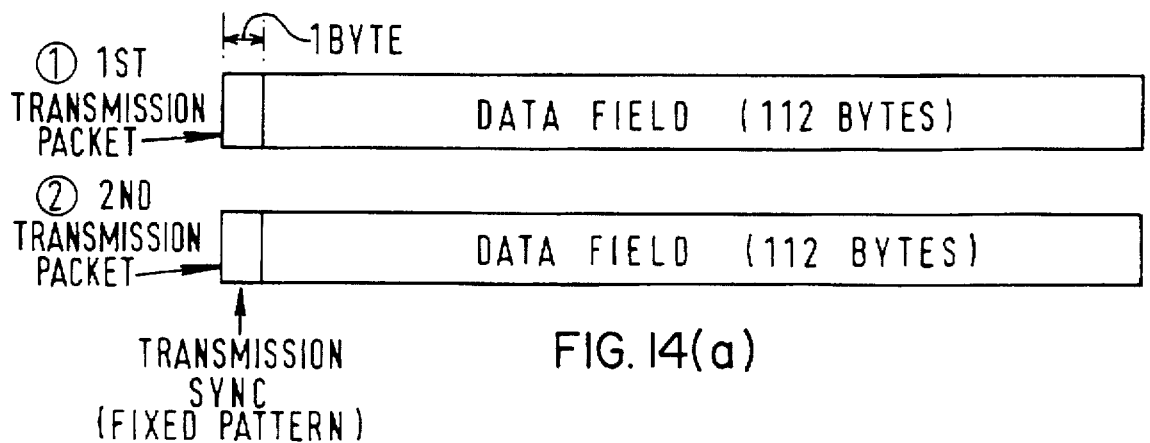
FIGS. 14 through 24 are diagrams for explaining modifications of the packet conversion according to the present invention.
Figure 14B:
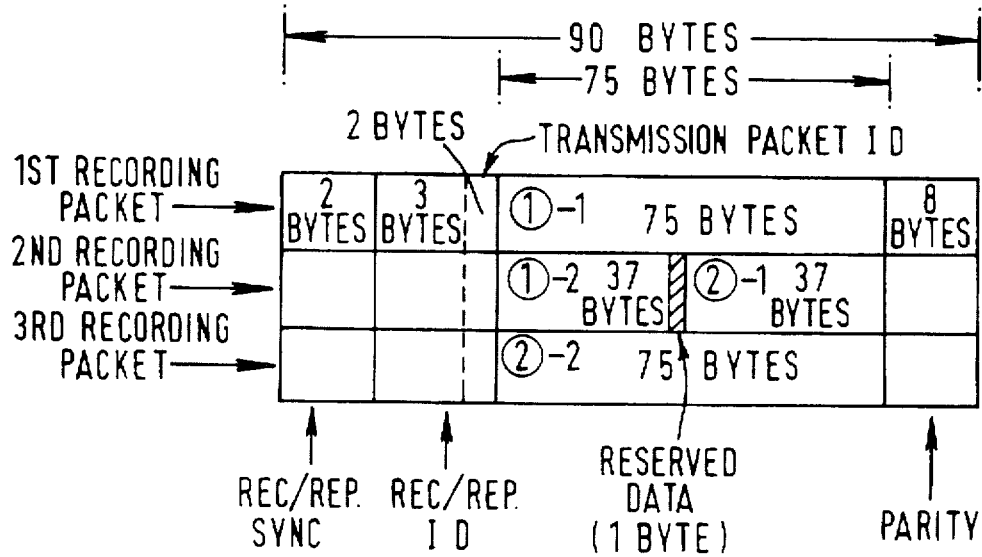

FIG. 14 shows a first modification of the packet conversion system according to the present invention. In this first modification it is assumed that the transmission packet has the volume of 113 bytes. Then the first one byte on the head of the transmission packet is assigned a sync signal with a fixed pattern for use in the transmission. As shown in FIG. 14, the volume of respective recording packet is set to 90 bytes length. On the head of each of the recording packets 2 fields. i.e., a field of recording/reproduction sync signal with 2 bytes volume and a field of ID signal with 5 bytes volume are located. The first 3 bytes of the ID signal are associated with the recording packet, while the remaining 2 bytes of the ID signal are associated with the transmission packet. In the 90 bytes length recording packet, 75 bytes constitute an effective recording field, and the trailing end 8 bytes are provided for a parity filed. As the transmission sync signal is of the fixed pattern, and thus the sync signal is fine to introduce in the reproducing operation, the 112 bytes data volume of the transmission signal of the transmission packet but without the sync signal is recorded in the recording packet.

A part of the transmission signal exceeding the volume of the effective recording field of one recording packet is recorded on the effective recording field of the next recording packet. That is, the trailing end 37 (=112−75) bytes of data of the first transmission packet is not recorded on the first recording packet, but recorded on the leading end of the second recording packet. Then although the leading end 37 bytes of data of the second transmission signal is recorded on the trailing end of the second recording packet, a 1 byte volume of reserved data field, e.g., a dummy data field is allocated between the first and second transmission signals. The remaining part of the second transmission signal, i.e., the trailing end 75 (=112−37) bytes data volume of the second transmission signal is recorded on the third recording packet.

Figure 15A:
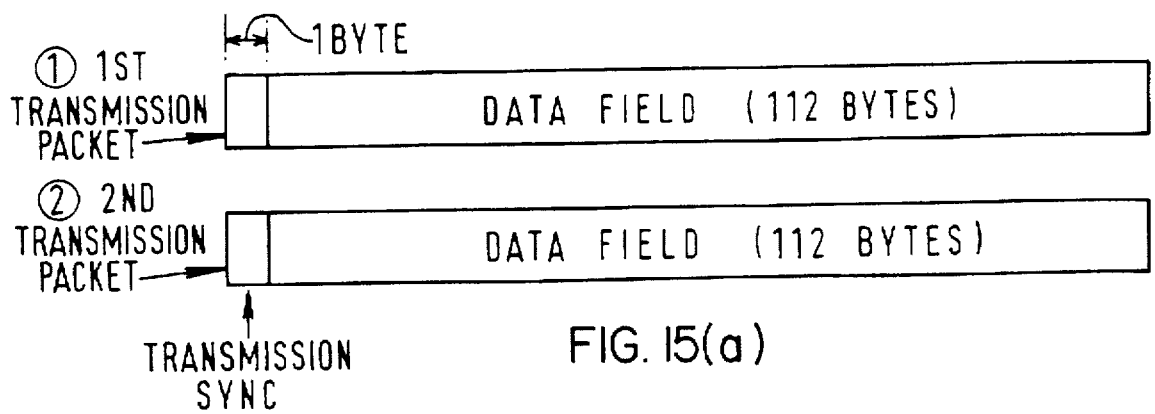
Figure 15B:
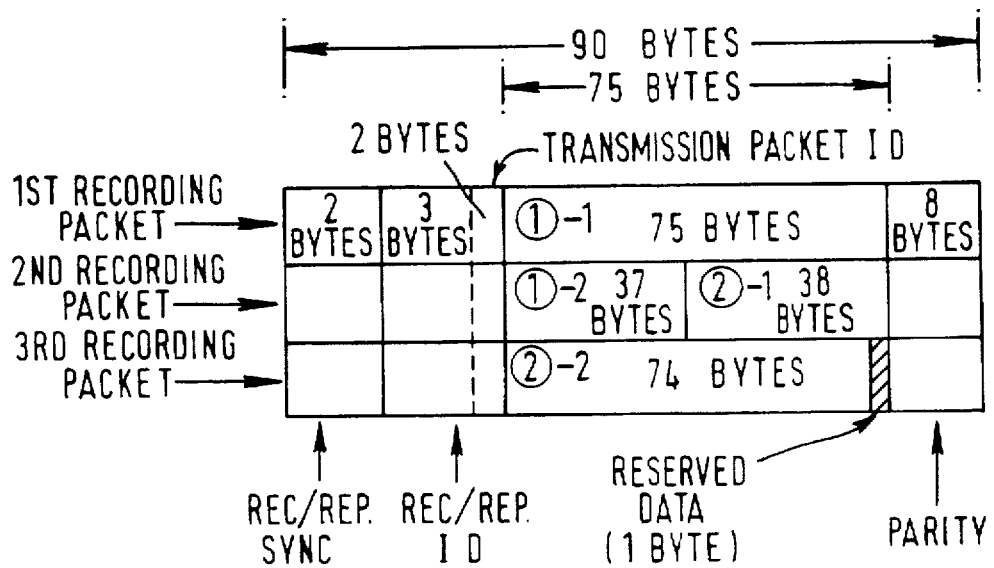

In the first modification as described above, the transmission signals of the 2 transmission packets are recorded over 3 recording packets, while introducing the reserved data field or the dummy data field for use in identifying the boundary of the succeeding two transmission signals FIG. 15 shows a second modification of the packet conversion system according to the present invention. In this second modification, although the packet conversion system is principally the same as that of the first modification. As seen from the comparison of FIGS. 14 and 15, the reserved data field is allocated on the tail end of the effective recording field of the third recording packet, which is different from the first modification.

Figure 16A:
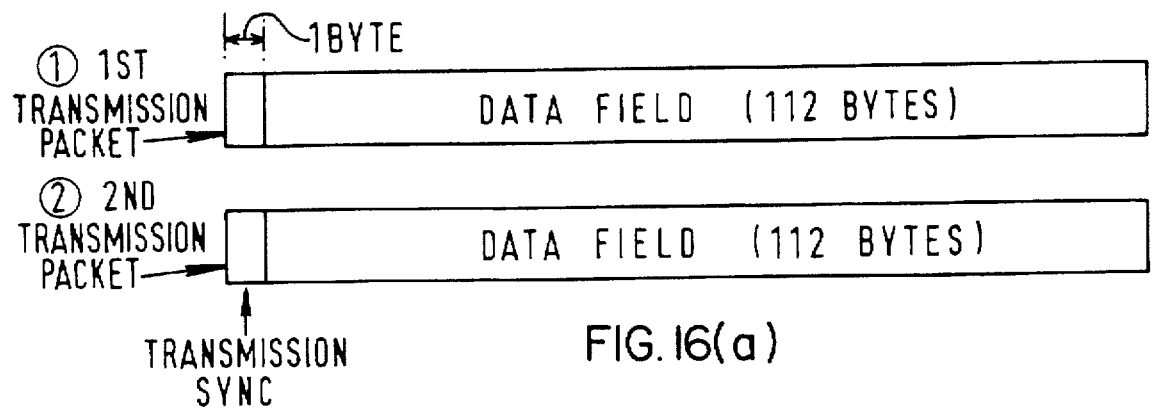
Figure 16B:
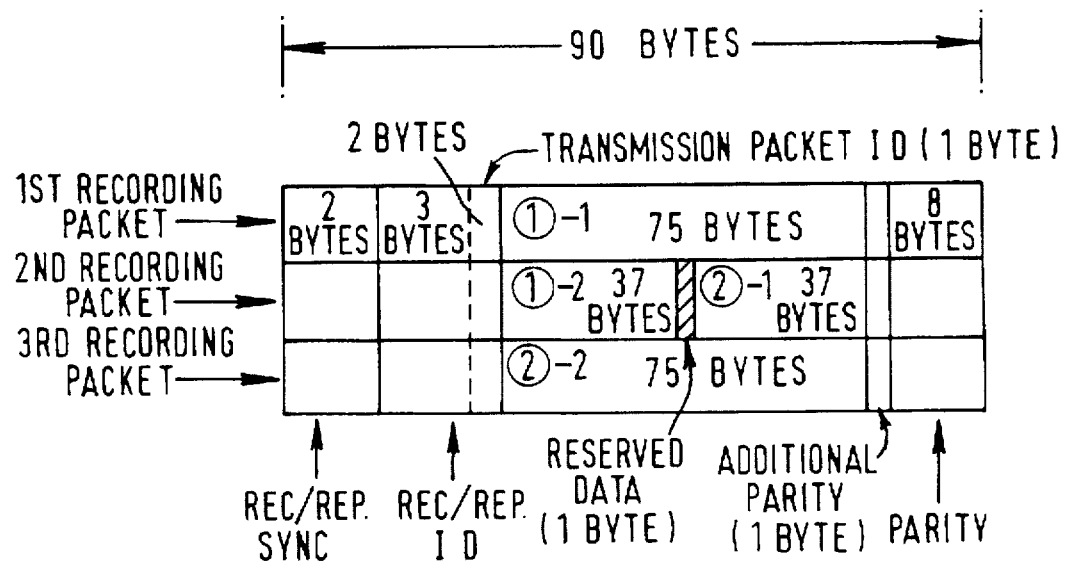
Figure 17A:
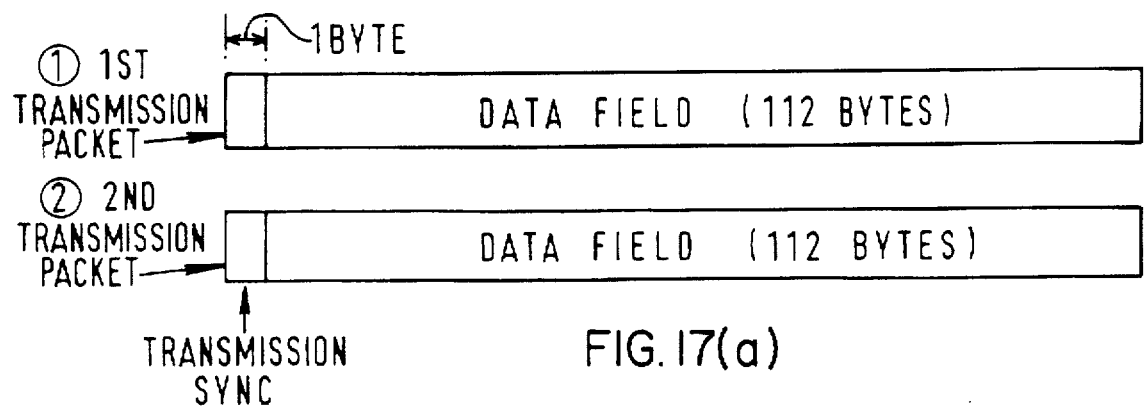
Figure 17B:
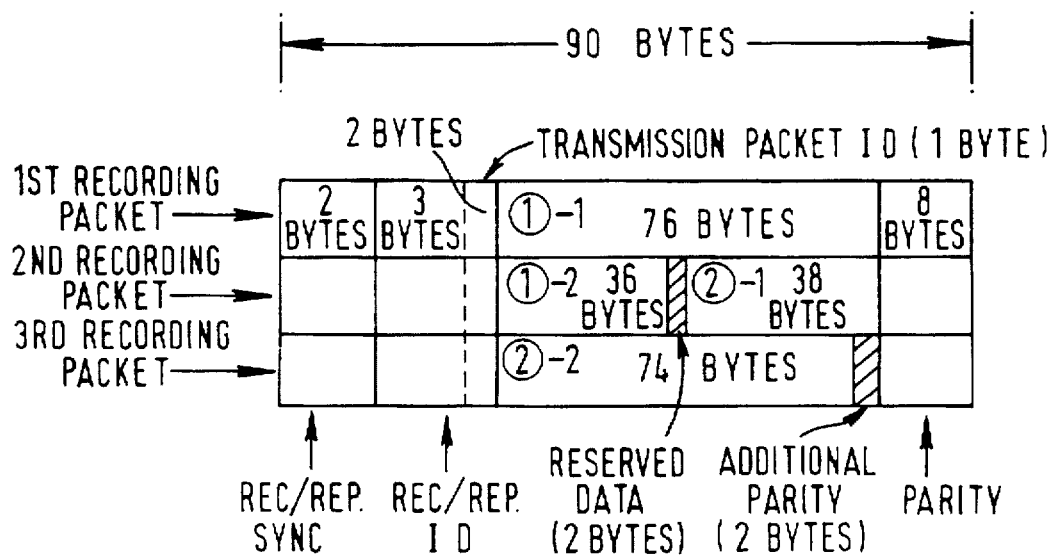

FIG. 16 shows a third modification of the packet conversion system according to the present invention. As the transmission sync signal assigned on the head of the transmission packet is of a fixed pattern, shown in FIG. 16, and thus the sync signal is introduced in the reproducing operation, the 112 bytes data volume of the transmission signal of the transmission packet but without the sync signal is recorded in the recording packet. The volume of respective effective recording field of the recording packet is set to the 90 bytes length. On the head of each of the recording packets 2 fields, i.e., a field of recording/reproduction sync signal with 2 bytes and a field of ID signal with 4 bytes are located. The first 3 bytes of the ID signal are associated with the recording packet, while remaining 1 byte of the ID signal is associated with the transmission packet. In the 90 bytes length recording packet, 75 bytes constitute an effective recording field, and the trailing end 8 bytes are provided for a parity field. Further 1 byte volume of another parity data is allocated in front of the 8 bytes volume of the parity field. In similar to the first modification, transmission signals on two transmission packets are recorded on three recording packets. Then a 1 byte volume of reserved data field, e.g., a dummy data field is allocated between the first and second transmission signals FIG. 17 shows a fourth modification of the packet conversion system according to the present invention. In this modification the conversion system same as the above three modifications is also adapted. As shown in FIG. 7, the 76 bytes data volume of each recording packet is assigned to the effective recording field, while 2 bytes data volume of recording/reproduction sync signal and 4 bytes data volume of ID signal are allocated on the head portion of the recording packet in the order. The first 3 bytes of the ID signal are associated with the recording packet, while remaining 1 byte of the ID signal is associated with the transmission packet.

The 36 bytes data on the trailing end of the transmission packet, which is the excess of the volume of the effective recording field of the first recording packet is recorded on the effective recording field of the next recording packet. Further a 2 bytes data volume of additional parity is positioned in the reserved data field or the dummy data field on the trail end of each transmission packet signal for use in detecting and correcting errors in each of the transmission packet signals. Then the signals in the second transmission packet is recorded over the trailing end 8 bytes volume of the second recording packet and the leading end 74 bytes volume of the third recording packet. Thus a 2 bytes data volume of additional parity is positioned in the reserved data field or the dummy data field assigned to the second transmission packet signal.

Figure 18A:
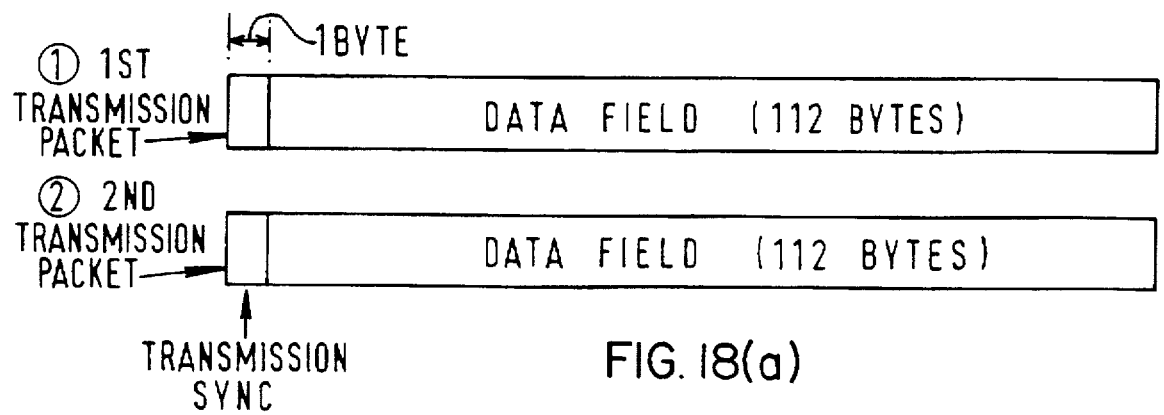
Figure 18B:
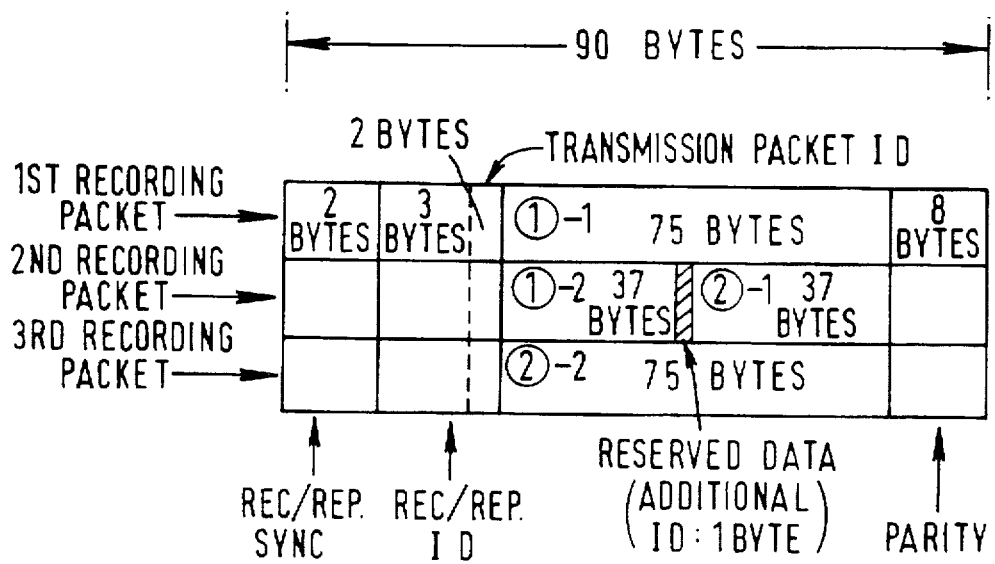

FIG. 18 shows a fifth modification of the packet conversion system according to the present invention. In this modification the reserved data field or the dummy data field used as an additional ID signal field for identifying transmission packets.

Figure 19A:
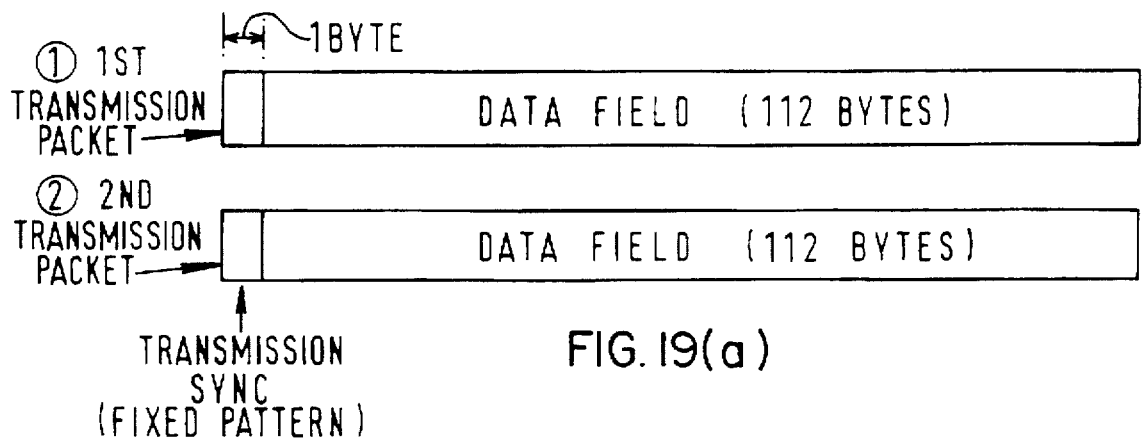
Figure 19B:
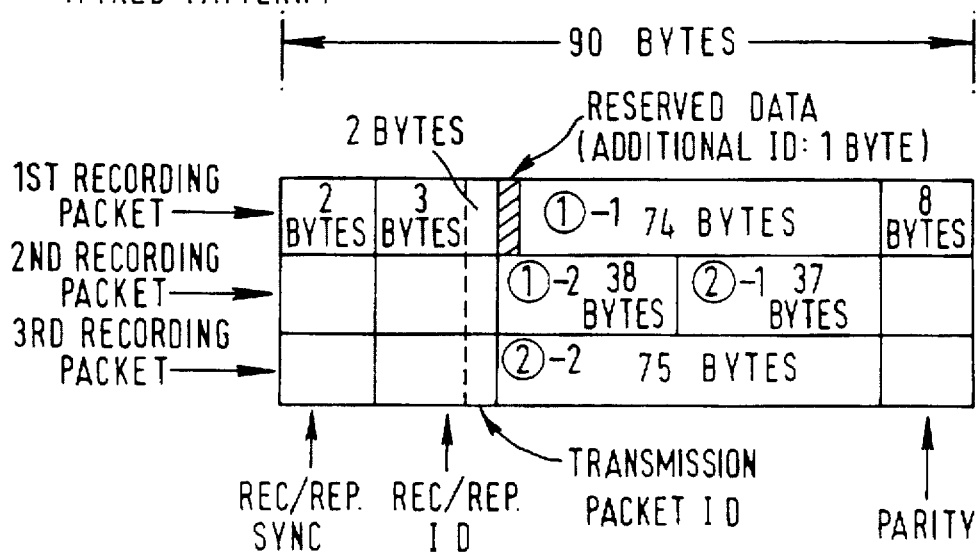

FIG. 19 shows a sixth modification of the packet conversion system according to the present invention. In this modification the 112 bytes data of each transmission packet signal are successively recorded over a plurality of recording packets. Then a 1 byte volume of reserved data field or dummy data filed is assigned on the head portion of the first transmission packet signal. Further, the reserved data field or the dummy data filed is used for allocating thereon an additional ID signal.

Figure 20A:
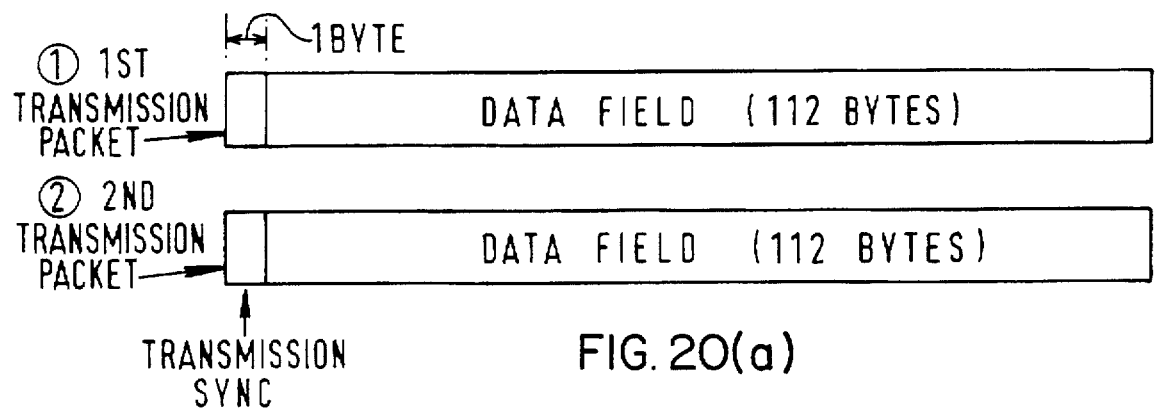
Figure 20B:
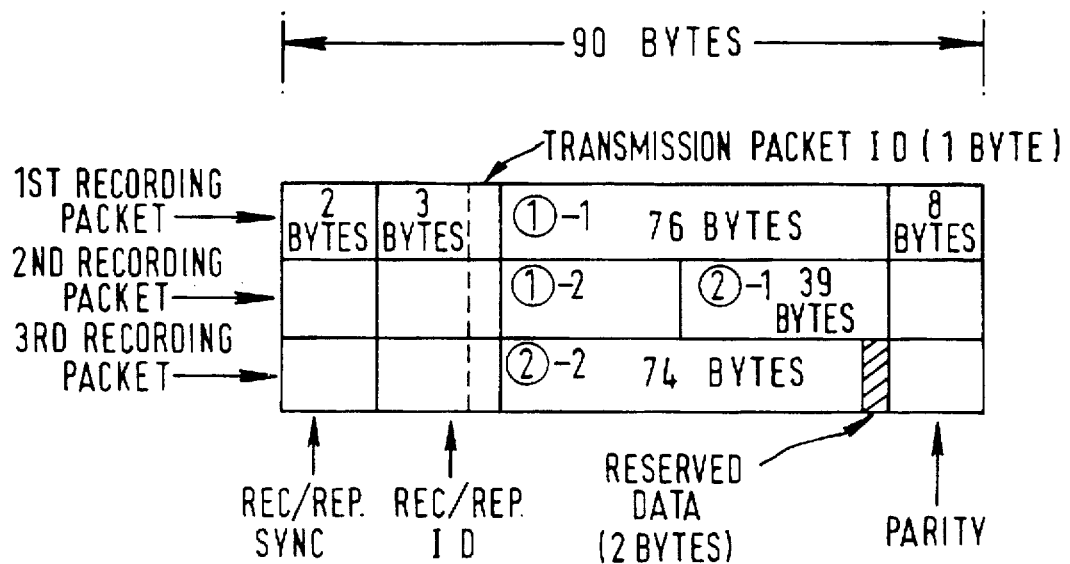

FIG. 20 shows a seventh modification of the packet conversion system according to the present invention. In this modification the transmission sync signal in each transmission packet is recorded on the recording packet in different from the above-described modifications where the transmission sync signals are not recorded on the recording packets. That is, the entire of the 113 bytes data volume of the transmission packet signal is recorded on the recorded packet.

The volume of respective recording packet is set to the 90 bytes length. On the head of each of the recording packets 2 fields, i.e., a field of recording/reproduction sync signal with 2 bytes and a field of ID signal with 4 bytes are located. The first 3 bytes of the ID signal are associated with the recording packet, while the remaining 1 byte of the ID signal is associated with the transmission packet. The 37 bytes data on the trailing end of the transmission packet, which is the excess of the 76 bytes volume of the effective recording field of the first recording packet, is recorded on the effective recording field of the next recording packet. Then the second transmission packet signal is recorded over the trailing end 39 bytes volume of the second recording packet and the leading end 74 bytes volume of the third recording packet. Thus a 2 bytes data volume of reserved data field or dummy data field is assigned to the trail end of the second transmission packet signal.

Figure 21A:
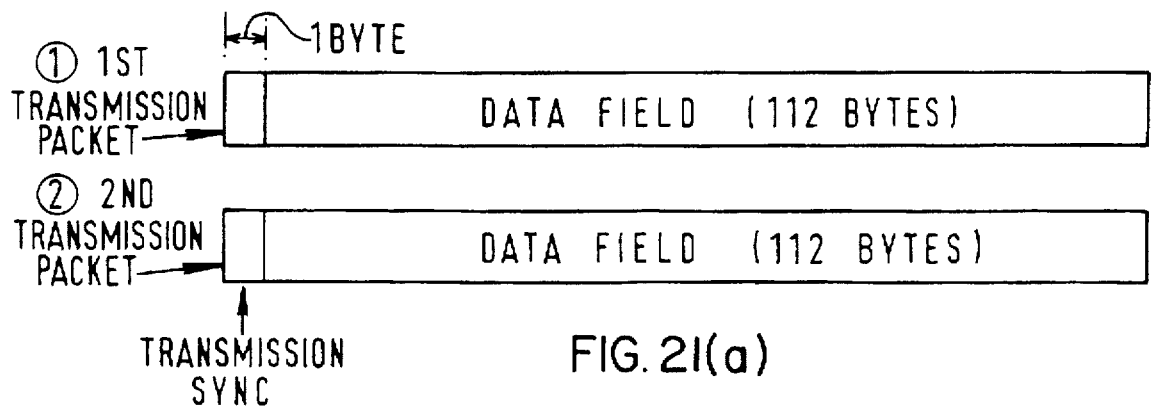
Figure 21B:
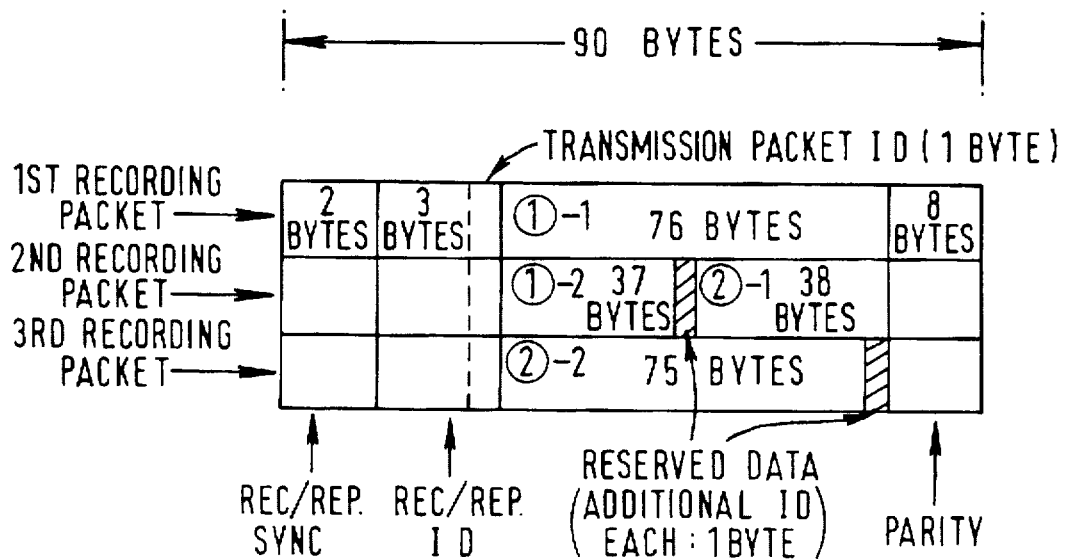

FIG. 21 shows an eighth modification of the packet conversion system according to the present invention. In this modification, the entire 113 bytes volume of the transmission packet signal is recorded over a plurality of recording packets similar to the embodiment of FIG. 19. Further, 2 bytes volume of reserved data field or dummy data field is assigned on the recording packet, but divided one by one in a manner that each byte of the reserved data field or the dummy data field is positioned on the trail end of each transmission packet signal. Then the reserved data field or the dummy data field is used as a parity signal for its corresponding transmission packet signal.

Figure 22A:
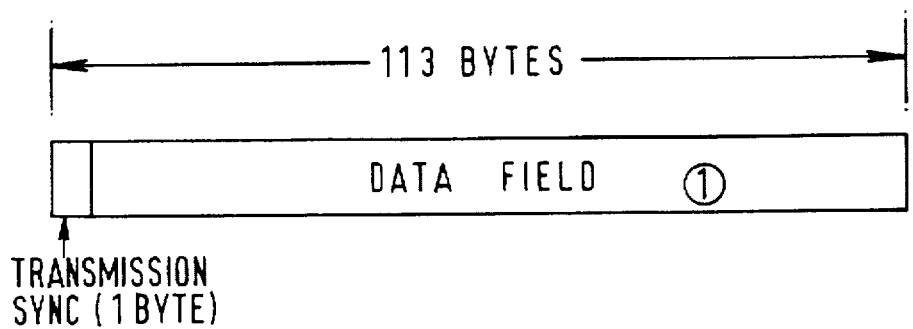
Figure 22B:
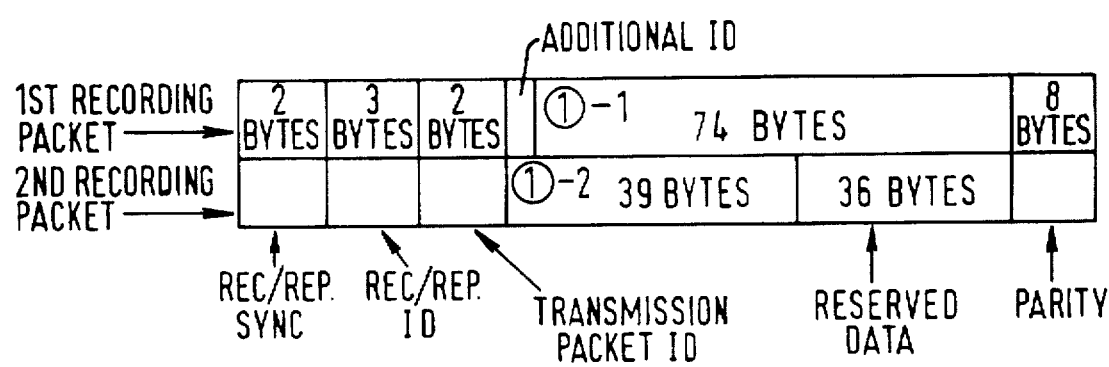

FIG. 22 shows a ninth modification of the packet conversion system according to the present invention. In this modification every transmission packet signal is recorded over two recording packets, as shown in FIG. 22. Further, in this modification the transmission sync signal in each transmission packet is recorded on the recording packet similar to the above-described seventh and eighth embodiments. Thus, the 113 bytes data volume of the transmission packet signal is recorded on the recorded packet similar to the above two embodiments.

The volume of respective recording packet is set to be 90 length. On the head of each of the recording packets 2 fields, i.e., a field of recording/reproduction sync signal with 2 bytes and a field of ID signal with 5 bytes are located. The first 3 bytes of the ID signal are associated with the recording packet, while the remaining 2 bytes of the ID signal are associated with the transmission packet. The volume of respective effective recording field; of the recording packet is set to 75 bytes. The leading end 74 bytes of the first transmission packet signal are recorded on the effective recording field of the first recording packet, while the remaining 74 bytes of the first transmission packet signal are recorded on the head portion of the effective recording field of the second recording packet. Then the remaining 36 bytes field of the effective recording field of the second recording packet is assigned for reserved data field or dummy data field.

In the first through ninth modifications, as shown in FIGS. 14 through 22, the volumes of the transmission packet and the recording packet are set to 113 bytes in length and 90 bytes in length, respectively. However, the present invention can be also carried out by altering the volume of either or both of the transmission packet and the recording packet, as shown in the following two additional embodiments without being limited to the above embodiments.

Figure 23A:
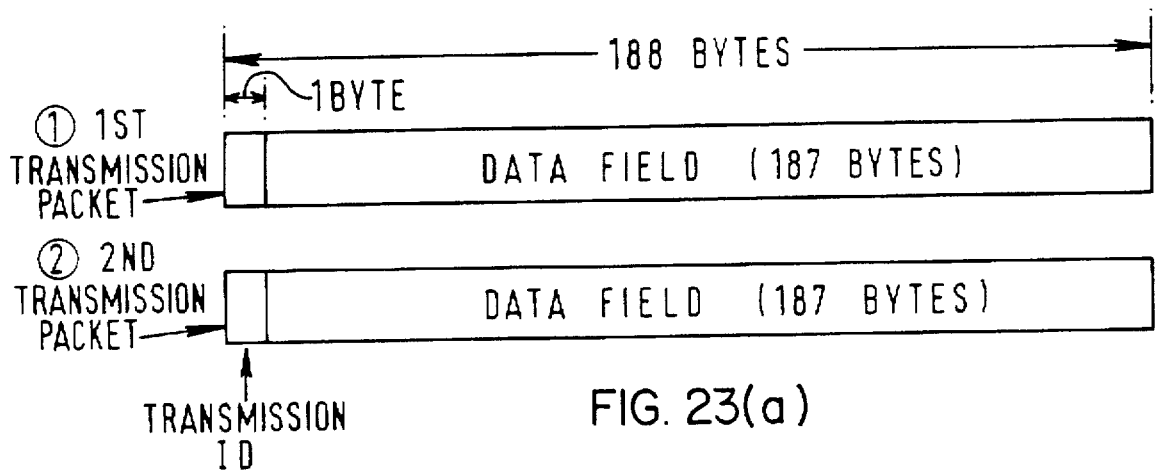
Figure 23B:
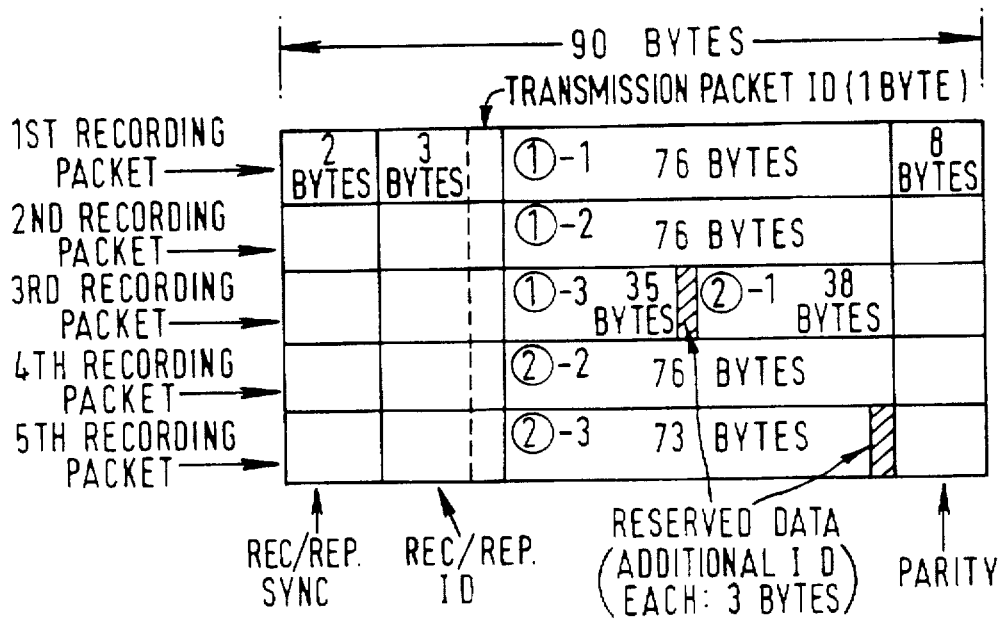

FIG. 23 shows a tenth modification of the packet conversion system according to the present invention. In this modification, the volume of the transmission packet is set to 188 bytes in length, similar to the MPEG transport packet.

While the volume of the recording packet is set to 90 bytes in length as in the above embodiments. Then the first byte on the head of the transmission packet is assigned a sync signal with a fixed pattern for use in the transmission.

In this modification, the 187 bytes data volume of transmission signal of the transmission packet but without the head portion 1 byte volume sync signal is recorded in the recording packet, similar to the fourth embodiment as shown in FIG. 17. Further, reserved data field or dummy data field is assigned a portion next to the trail end of each of the transmission packet signals. Then the reserved data field or the dummy data field is used as an additional parity signal.

As shown in FIG. 23, the first 76 bytes data of the first transmission packet signal is recorded on the first recording packet. The next 76 bytes data of the first transmission packet signal is recorded on the second recording packet. Then the remaining 35 bytes data of the first transmission packet signal is recorded on the leading end of the effective recording field of the third recording packet. Next, the first 38 bytes data of the second transmission packet signal is recorded on the trailing end of the effective recording field of the third recording packet, but spaced from the last 35 bytes data of the first transmission packet signal by the 3 bytes volume reserved data field or the dummy data field. The next 76 bytes data of the second transmission packet signal is recorded on the fourth recording packet. Then the remaining 73 bytes data of the second transmission packet signal is recorded on the leading end of the effective recording field of the fifth recording packet in leaving a space at the trailing end of the effective recording field of the fifth recording packet. Then the space is assigned for the other 3 bytes volume reserved data field or the dummy data field.

Figure 24A:
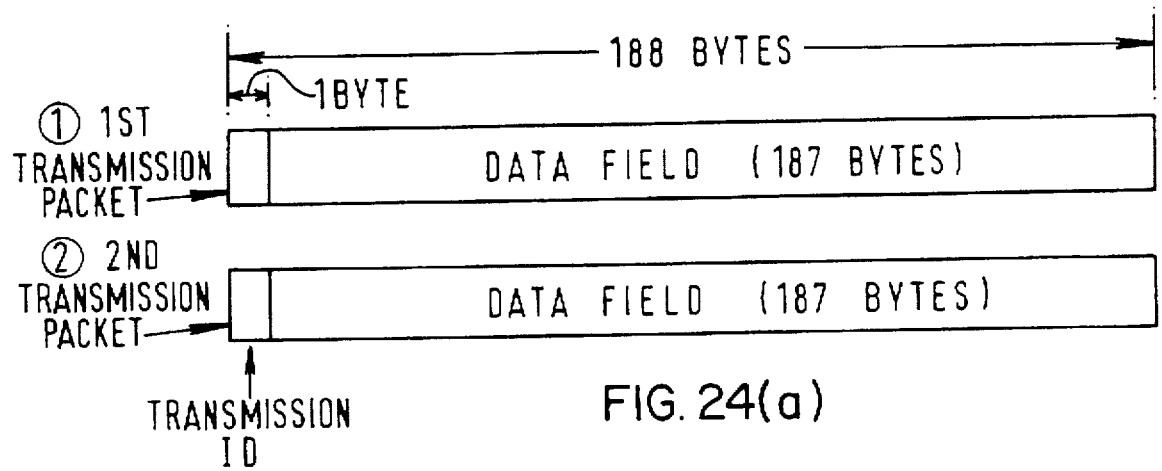
Figure 24B:
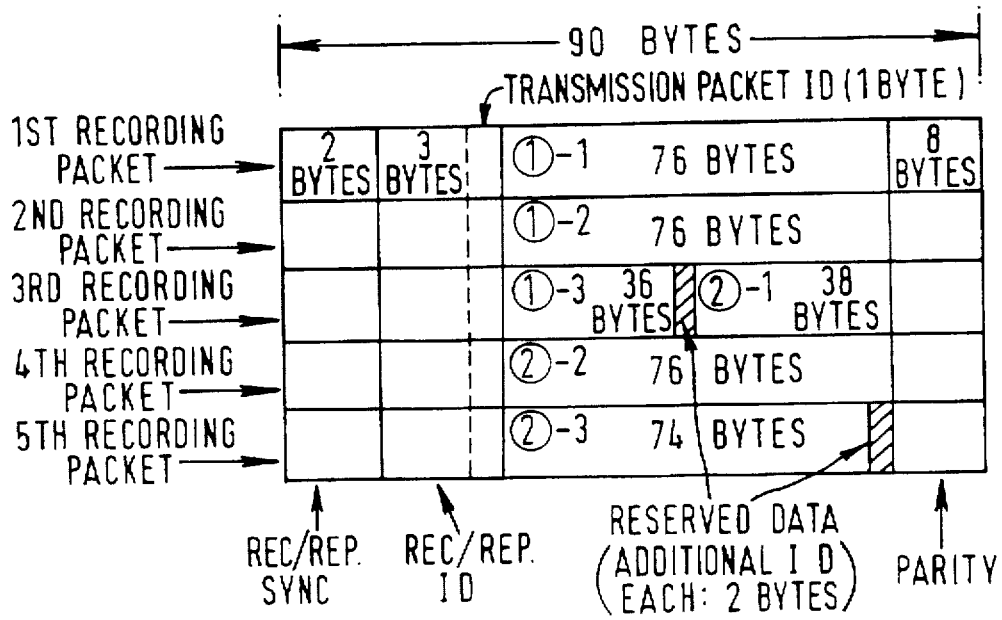

FIG. 24 shows an eleventh modification of the packet conversion system according to the present invention. In this modification, the volume of the transmission packet is also set to 188 bytes in length, similar to the MPEG transport packet. While volume of the recording packet is set to 90 bytes in length as in the above first through ninth embodiments. Then, the first byte on the head of the transmission packet is assigned a sync signal with a fixed pattern for use in the transmission.

In this modification, the entire 188 bytes data volume of transmission signal of the transmission packet including the head portion 1 byte volume sync signal is recorded in the recording packet, similar to the seventh embodiment as shown in FIG. 20. Further, the reserved data field or dummy data field is assigned to a portion next to the trail end of each of the transmission packet signals. Then the reserved data field or the dummy data field is used as an additional parity signal.

As shown in FIG. 23, the first 76 bytes data of the first transmission packet signal is recorded on the first recording packet. The next 76 bytes data of the first transmission packet signal is recorded on the second recording packet. Then the remaining 36 bytes data of the first transmission packet signal is recorded on the leading end of the effective recording field of the third recording packet.

Next, the first 38 bytes data of the second transmission packet signal is recorded on the trailing end of the effective recording field of the third recording packet, but spaced from the last 36 bytes data of the first transmission packet signal by the 2 bytes volume reserved data field or the dummy data field. The next 76 bytes data of the second transmission packet signal is recorded on the fourth recording packet. Then the remaining 74 bytes data of the second transmission packet signal is recorded on the leading end of the effective recording field of the fifth recording packet leaving a space at the trailing end of the effective recording field of the fifth recording packet. Then the space is assigned for the other 2 bytes volume reserved data field or the dummy data field.

As described above, the present invention can provide an extremely preferable packet conversion apparatus and system, having the effect such that a propagation of errors can be suppressed and also such that the circuit scale can be reduced.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims.

What is claimed is:

1. A packet conversion apparatus comprising:
   means for detecting heads of transmission packet signals;
   means responsive to the detecting means for packetizing the transmission packet signals by sequentially arranging them into one or more recording packets so that a prescribed number of transmission packet signals are placed at specific positions within one or more recording packets;
   means for determining the difference between a length of the one or more recording packets and an effective length of the prescribed number of transmission packet signals to locate portions of the recording packets unoccupied by transmission packet signals;
   a source for supplying dummy or reserved data; and
   means for inserting the dummy or reserved data into the portions of the recording packets unoccupied by transmission packet signals.

2. The packet conversion apparatus of claim 1 wherein the portion of the recording packets unoccupied by transmission packet signals has a length equal to the length of at least one recording packet.

3. The packet conversion apparatus of claim 1 wherein the inserting means inserts the dummy or reserved data to adjust the difference between a data transmission rate and a data recording rate.

4. A packet conversion system comprising the steps of:
   detecting heads of transmission packet signals;
   packetizing in response to the detection of the heads of the transmission packet signals by sequentially arranging them into one or more recording packets so that a prescribed number of transmission packet signals are placed at specific positions within one or more recording packets;
   determining the difference between a length of the one or more recording packets and an effective length of the prescribed number of transmission packet signals to locate portions of the recording packets unoccupied by transmission packet signals;
   supplying dummy or reserved data; and
   inserting the dummy or reserved data into the portions of the recording packets unoccupied by transmission packet signals.

5. The packet conversion system of claim 4 wherein the portion of the recording packets unoccupied by transmission packet signals has a length equal to the length of at least one recording packet.

6. The packet conversion system of claim 4 wherein the dummy or reserved data is inserted to adjust the difference between a data transmission rate and a data recording rate.

7. A packet conversion apparatus comprising:
   means for detecting heads of transmission packet signals;
   means responsive to the detecting means for packetizing the transmission packet signals by sequentially arranging them into a number of one or more recording packets so that a prescribed number of transmission packet signals are placed at specific positions within one or more recording packets;
   means for determining the difference between a length of the one or more recording packets and an effective length of the prescribed number of transmission packet signals to locate portions of the recording packets unoccupied by transmission packet signals;
   a source for supplying dummy or reserved data; and
   means for inserting the dummy or reserved data into the portions of the recording packets unoccupied by transmission packet signals to compensate for the difference in length between the length of the one or more recording packets and the effective length of the prescribed number of transmission packet signals.

8. The packet conversion apparatus of claim 7 wherein the portion of the recording packets unoccupied by transmission packet signals has a length equal to the length of at least one recording packet.

9. A packet conversion system comprising the steps of:
   detecting heads of transmission packet signals;
   packetizing in response to the detection of the heads of the transmission packet signals by sequentially arranging them into one or more recording packets so that a prescribed number of transmission packet signals are placed at specific positions within one or more recording packets;
   determining the difference between a length of the one or more recording packets and an effective length of the prescribed number of transmission packet signals to locate portions of the recording packets unoccupied by transmission packet signals;
   supplying dummy or reserved data; and
   inserting the dummy or reserved data into the portions of the recording packets unoccupied by transmission packet signals to compensate for the difference in length between the length of the one or more recording packets and the effective length of the prescribed number of transmission packet signals.

10. The packet conversion system of claim 9 wherein the portion of the recording packets unoccupied by transmission packet signals has a length equal to the length of at least one recording packet.

* * * * *